C. C. BOYD.
HARROW.
APPLICATION FILED MAR. 27, 1916.

1,201,547.

Patented Oct. 17, 1916.
2 SHEETS—SHEET 1.

Witnesses

C. C. Boyd,
Inventor by C. A. Snow & Co.
Attorneys

C. C. BOYD.
HARROW.
APPLICATION FILED MAR. 27, 1916.
1,201,547.
Patented Oct. 17, 1916.
2 SHEETS—SHEET 2.
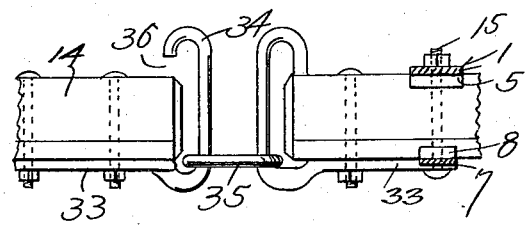
Fig. 4.
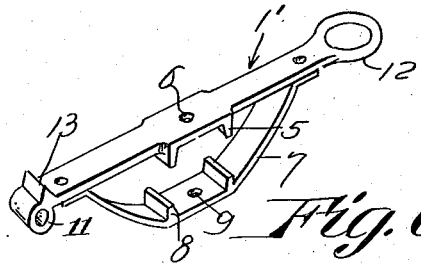
Fig. 6.
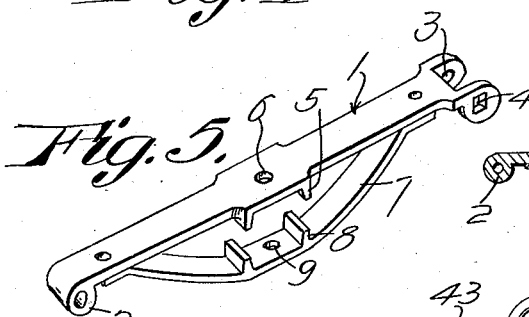
Fig. 5.
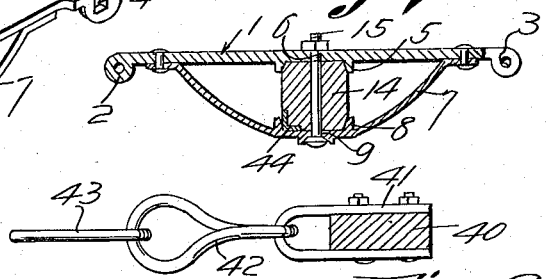
Fig. 7.
Fig. 8.
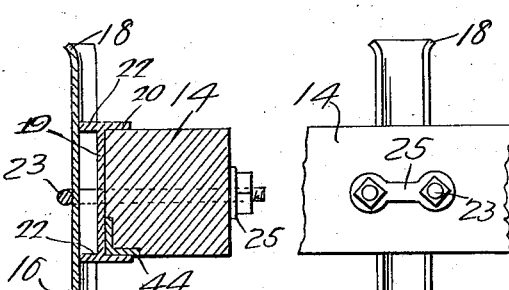
Fig. 9. Fig. 10.
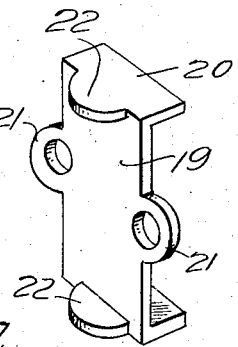
Fig. 11.
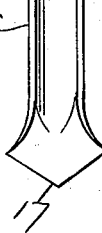
Fig. 12.
C. C. Boyd,
Inventor
Witnesses
by C. A. Snow & Co.
Attorneys

UNITED STATES PATENT OFFICE.

CALVIN C. BOYD, OF PULASKI, PENNSYLVANIA.

HARROW.

1,201,547.  Specification of Letters Patent.  Patented Oct. 17, 1916.

Application filed March 27, 1916. Serial No. 87,040.

*To all whom it may concern:*

Be it known that I, CALVIN C. BOYD, a citizen of the United States, residing at Pulaski, in the county of Lawrence and State of Pennsylvania, have invented a new and useful Harrow, of which the following is a specification.

This invention relates to harrows, one of the objects being to provide a harrow made up of flexibly connected tooth carrying bars whereby the harrow can adapt itself automatically to any unevenness in the contour of the ground over which it is drawn and whereby the teeth will readily free themselves of stones, stalks or other obstructions.

A further object is to provide a harrow of this type which can be readily stiffened so as to remove the flexible feature.

A further object is to provide novel means for attaching teeth to the bars of the harrow.

Another object is to provide novel connections between the bars, said connections serving to hold the teeth on the several bars properly positioned relative to each other and said connections being so constructed that they will not easily get out of order.

A further object is to provide a harrow which, when not in use, can be rolled up so as to occupy the minimum space, and thus be conveniently stored and shipped.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
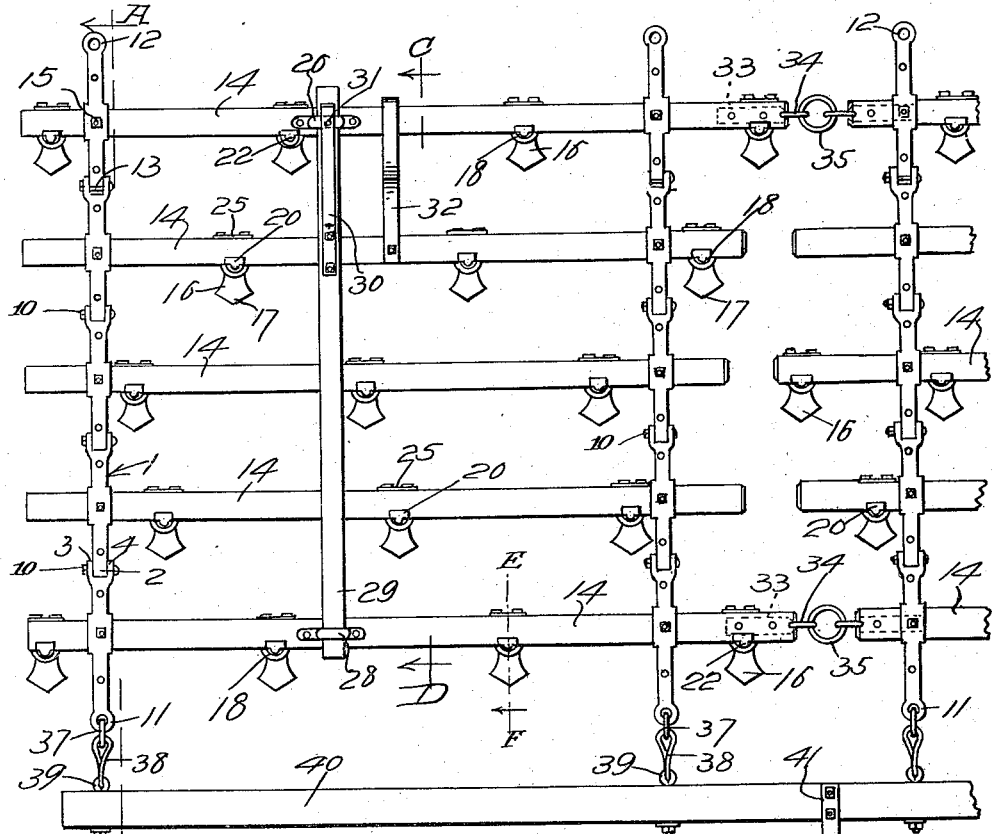
Figure 2:
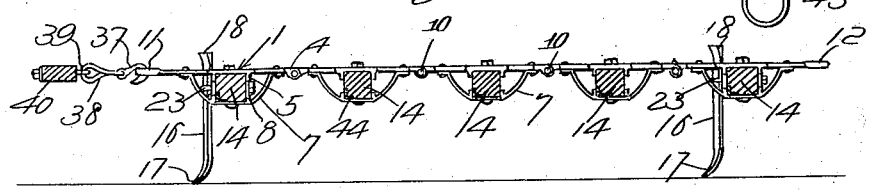
Figure 3:
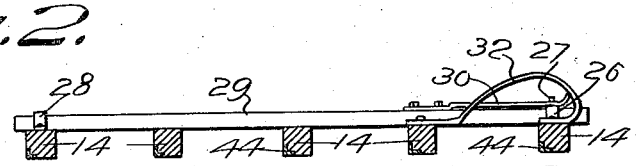

In said drawings: Figure 1 is a plan view of a portion of a harrow embodying the present improvements, one complete section and a portion of another section being shown. Fig. 2 is a section on line A—B Fig. 1. Fig. 3 is a section on line C—D Fig. 1. Fig. 4 is an enlarged elevation of one of the connections between two of the harrow sections. Fig. 5 is a perspective view of one of the hinge members. Fig. 6 is a perspective view of another one of the hinge members. Fig. 7 is an enlarged section through one of the bars of the harrow and showing a hinge section in position thereon. Fig. 8 is an enlarged side elevation of one of the means employed for connecting a whiffletree to the draw bar of the harrow. Fig. 9 is an enlarged section on line E—F Fig. 1. Fig. 10 is a rear elevation of the parts shown in Fig. 9. Fig. 11 is a perspective view of one of the backing plates used in connection with a tooth. Fig. 12 is a perspective view of one of the members of the fastener used in connection with a stiffener bar.

Referring to the figures by characters of reference 1 designates a hinge strap provided at one end with an eye 2 extending transversely thereof while its other end is forked, the sides of the fork being provided with apertures one of which is round, as shown at 3, while the other is angular as shown at 4. Parallel ribs 5 depend from the strap adjacent the center thereof, the inner faces of the ribs converging upwardly and an opening 6 is formed in the strap between the ribs.

Riveted or otherwise fastened to the strap close to the ends thereof are the end portions of a brace 7 having upwardly extending parallel ribs 8 disposed directly below the ribs 5 and having their inner faces converging downwardly, there being an opening 9 within the brace and between these ribs 8 and in alinement with the opening 6.

Straps 1 together with their braces 7 are adapted to be arranged in strings, the several straps being pivotally connected by bolts 10 extending through the eyes 2 which are inserted in the forked ends of the adjacent straps, the bolts having angular portions seated in the angular openings 4 so as to be held against rotation. The strap at one end of the string has an eye 11 and the strap at the other end of the string is likewise provided with an eye 12, this last named strap being formed with an upstanding rib 13 adjacent the eye 11 thereof which projection is designed to coöperate with the adjacent strap to limit the upward swinging movement of the end strap.

Each harrow section may be provided with a desired number of strings of hinges. In the structure illustrated, two of these strings are employed in connection with a section. The corresponding straps of each string are fastened to bars 14 extending thereunder which are straddled by the ribs 5, the lower portions of the bars extending between the ribs 8 carried by the braces 7. Bolts 15 are extended through the bars and also through the openings 6 and 9 and when tightened serve to draw the braces 7 and the straps 1 toward each other, thus to bind the ribs 8 and 5 against the bar. With the bars thus connected it will be seen that a flexible harrow structure is provided although the bars will be held against lateral displacement relative to each other and the rear end bar will be prevented from kicking upwardly too far when passing over an obstruction, by the projections 13 coöperating with the ends of the adjoining straps 1.

The harrow teeth are adapted to be secured at any desired points upon the bars. They are preferably so arranged that no two teeth will travel in the same path. Each tooth is preferably formed of a transversely bowed strip, as shown at 16, the lower end of each tooth being flared and curved forwardly to a point as at 17, while the upper end of each tooth is flared outwardly as at 18. Arranged back of each tooth is a backing plate 19 having flanges 20 at the top and bottom thereof for engaging the corresponding faces of the bar 14. Ears 21 extend laterally from the backing plate and segmental ears 22 extend forwardly from the end portions of the backing plate and are adapted to fit snugly against the concave face of the tooth. A U-bolt 23 straddles the tooth and extends through the bar 14 and also through a double washer 25 such as shown in Fig. 10 which washer engages the back face of the bar 14. Obviously by tightening the U-bolt 23 the tooth 16 will be clamped tightly against the backing plate 19 and the segmental ears 22. The arms of the U-bolt are extended through the ears 21 so that said bolt is thus prevented from spreading. Should the bolts become loosened accidentally, the tooth 16 could not drop out of position for the reason that the flared portion 18 would come against the bolt 23 and hold the tooth attached to the bar 14. Thus loss of the tooth is prevented.

Mounted on the rear bar 14 of the harrow is an angular bracket or keeper 26 having an upstanding lug 27. Another similar keeper 28, which, however, is not provided with a lug 27, is secured to the front bar 14. This keeper 28 is designed to receive one end of a stiffening bar 29 the other end of which is insertible into the keeper 26. Secured on this stiffening bar is a spring strip 30 having an opening 31 for the reception of the lug 27. Thus after the stiffening bar 29 has been inserted into the two keepers and the spring strip 30 placed in engagement with lug 27, the harrow will be rendered practically rigid although the intermediate bars will have a slight relative movement so that the efficiency of the harrow will not be materially impaired. As an additional means for limiting the upward kicking of the rear bar 14, a spring stop strip 32 may be attached to the bar next to the rear one and where it will be contacted by the rear bar when moving upwardly.

In order that two or more sections may be connected, the front and back bars of each section may be provided with plates 33 secured to the bottom faces thereof and terminating in upstanding loops 34 extending outwardly from the ends of the bars. These loops are adapted to receive coupling rings 35, and one of the two loops engaged by each ring is preferably arranged with its upper end spaced from the bar as shown at 36 so that the ring can be easily uncoupled therefrom.

Each of the eyes 11 at the front end of the harrow is adapted to be engaged by a hook 37 or the like connected to a twisted link 38 which, in turn, is fastened by an eye bolt 39 to a draw bar 40 extending transversely in front of the section. This draw bar may be provided with one or more U-shape brackets 41 having a twisted link 42 provided with a ring 43 for engagement by a whiffletree. It is to be understood that under some conditions the harrow may be drawn backwardly at which time the hooks 37 should be placed in engagement with the eyes 12.

In using the harrow the stiffening bars 29 may or may not be used, as preferred. If these stiffening bars are not employed the several transverse bars 14 will obviously be capable of tilting relative to each other by reason of the hinge connection. If desired, the entire harrow can be drawn backwardly over a field so that the back faces of the teeth can thus be first drawn over the ground after which the harrow can be drawn forwardly over the same path to cause the teeth 17 to work into the soil and pulverize it. By using the harrow in this manner the soil will be quickly pulverized. By having the bars capable of tilting relative to each other, the harrow will conform to any unevenness in the contour of the ground. Should it be desired to render the harrow practically rigid the stiffening bars 29 can be placed in engagement with the brackets 28 and 26 as hereinbefore described. When the harrow is not in use the stiffening bars can be removed and the entire harrow rolled up so as to occupy but little space. Obviously a single section can be used or several sections can be employed. In the latter event, the sections will be connected by the means shown in detail in Fig. 4 and which have been described hereinbefore.

In order that the bars 14 may be protected against wear by stones and other obstructions which may come into contact there-with, each of these bars is preferably provided with a wear strip 44 which can be of angle iron secured along the lower front edge of the bar.

What is claimed is:—

1. A harrow including parallel series of pivotally connected hinge straps, a brace extending under and secured to each hinge strap, the ends of each strap projecting beyond the corresponding ends of the brace thereunder, parallel bars extending between the hinge straps and their respective braces and secured thereto, and soil engaging devices carried by the bars.

2. A harrow including parallel series of pivotally connected hinge straps, a brace extending under and secured to each hinge strap, parallel bars extending between the hinge straps and their respective braces and secured thereto, soil engaging devices carried by the bars, and coöperating means upon certain of the straps for limiting the upward movement of one of the bars relative to the adjoining bar.

3. A harrow including parallel series of pivotally connected hinge straps, a brace extending under and secured to each hinge strap, parallel bars extending between the hinge straps and their respective braces and secured thereto, soil engaging devices carried by the bars, and means upon each strap and the brace thereunder for straddling the bar engaged by the strap and brace and binding upon the front and back faces thereof.

4. A harrow including parallel series of pivotally connected hinge straps, a brace extending under and secured to each hinge strap, parallel bars extending between the hinge straps and their respective braces and secured thereto, soil engaging devices carried by the bars, and means for limiting the upward movement of one of the end bars relative to the adjoining bar.

5. A harrow including parallel series of pivotally connected hinge straps, a brace extending under and secured to each hinge strap, parallel bars extending between the hinge straps and their respective braces and secured thereto, and stiffening means detachably mounted upon the bars.

6. A harrow including parallel series of pivotally connected hinge straps, a brace extending under and secured to each hinge strap, parallel bars extending between the hinge straps and their respective braces and secured thereto, and stiffening means detachably mounted upon the bars, said means including a bar extending across the first named bars, keepers secured upon certain of the first named bars and detachably engaged by the stiffening bar, and means for locking the stiffening bar in the keepers.

7. A harrow including parallel series of pivotally connected hinge straps, a brace secured to and arranged under each of the hinge straps, the ends of each strap projecting beyond the ends of the brace secured thereunder, parallel transverse bars extending between the hinge straps and their respective braces, means for fastening the transverse bars to the straps and braces, soil engaging devices carried by said transverse bars, and means upon the end straps of each series for engagement by a draft device.

8. A harrow including parallel series of pivotally connected hinge straps, a brace secured to and arranged under each of the hinge straps, parallel transverse bars extending between the hinge straps and their respective braces, means for fastening the transverse bars to the straps and braces, soil engaging devices carried by said transverse bars, keepers secured to the end transverse bars, an upstanding stud upon one of the keepers, a stiffening bar insertible into the keepers and extending across all of the transverse bars, and a spring strip secured to the stiffening bar for engagement with the stud to hold said stiffening bar in engagement with the keepers.

In testimony that I claim the foregoing as my own, I have hereto affixed my signature in the presence of two witnesses.

CALVIN C. BOYD.

Witnesses:
W. S. BELL,
W. S. MARSHALL.